United States Patent
Zhang et al.

(10) Patent No.: US 10,875,276 B2
(45) Date of Patent: Dec. 29, 2020

(54) SOUNDPROOF COMPOSITE FLOORING OF MAGNESIUM SULFATE AND SOLID WOOD

(71) Applicant: JIANGSU BBL HOME TECHNOLOGY COMPANY LIMITED, Jiangsu (CN)

(72) Inventors: Xiaoling Zhang, Jiangsu (CN); Guohong Zhang, Jiangsu (CN); Zhiyuan Xiao, Jiangsu (CN); Haidi Lin, Jiangsu (CN)

(73) Assignee: JIANGSU BBL HOME TECHNOLOGY COMPANY LIMITED, Changzhou (CN)

(*) Notice: Subject to any disclaimer, the term of this patent is extended or adjusted under 35 U.S.C. 154(b) by 0 days.

(21) Appl. No.: 16/827,690

(22) Filed: Mar. 23, 2020

(65) Prior Publication Data
US 2020/0316911 A1    Oct. 8, 2020

(30) Foreign Application Priority Data
Apr. 4, 2019    (CN) .......................... 2019 1 0271984

(51) Int. Cl.
*B32B 13/10*    (2006.01)
*B32B 7/12*    (2006.01)
(Continued)

(52) U.S. Cl.
CPC ............... *B32B 13/10* (2013.01); *B32B 3/02* (2013.01); *B32B 3/266* (2013.01); *B32B 7/12* (2013.01);
(Continued)

(58) Field of Classification Search
CPC .. B32B 13/10; B32B 7/12; B32B 3/02; B32B 3/266; B32B 21/14; B32B 2255/08;
(Continued)

(56) References Cited

U.S. PATENT DOCUMENTS 2,044,535 A * 6/1936 Luzzati ................. E04F 15/022
                                                      428/56
5,277,010 A    1/1994 Stephenson et al.
(Continued)

FOREIGN PATENT DOCUMENTS

CN          2571886 Y      9/2003
CN        102864893 A      1/2013
(Continued)

*Primary Examiner* — Nathan L Van Sell
(74) *Attorney, Agent, or Firm* — Wayne & Ken, LLC; Tony Hom

(57) ABSTRACT

The invention relates to composite floorings, more particularly to a soundproof composite flooring of magnesium sulfate and solid wood. The soundproof composite flooring includes a paint layer, a solid wood layer, a magnesium sulfate substrate layer, and a soundproof layer which are sequentially arranged from top to bottom; the solid wood layer and the magnesium sulfate substrate layer are bonded via AB glue by cold pressing or via a hot-melt adhesive; a plurality of cylindrical holes are arranged along edges of an upper surface of the magnesium sulfate substrate layer, and a buffer structure is arranged in each of the cylindrical holes; the buffer structure includes a rubber base which fits a bottom of the cylindrical holes, and a support disk which is opposite to the solid wood layer. The rubber base and the support disk are connected by a rubber column.

7 Claims, 3 Drawing Sheets

(51) Int. Cl.
*B32B 3/26* (2006.01)
*B32B 3/02* (2006.01)
*E04F 15/04* (2006.01)
*E04F 15/10* (2006.01)
*B32B 21/14* (2006.01)

(52) U.S. Cl.
CPC ............ *B32B 21/14* (2013.01); *E04F 15/041* (2013.01); *E04F 15/107* (2013.01); *B32B 2255/08* (2013.01); *B32B 2307/10* (2013.01); *B32B 2419/04* (2013.01)

(58) Field of Classification Search
CPC ............. B32B 2307/10; B32B 2419/04; E04F 15/107; E04F 15/041
See application file for complete search history.

(56) References Cited

U.S. PATENT DOCUMENTS

| | | | | |
|---|---|---|---|---|
| 2004/0126602 | A1* | 7/2004 | Wallner | ................ E04F 13/141 428/500 |
| 2005/0100711 | A1* | 5/2005 | Malpass | .................... B32B 3/02 428/156 |
| 2010/0222457 | A1* | 9/2010 | Wallner | ................. E04F 15/02 524/4 |

FOREIGN PATENT DOCUMENTS

| | | |
|---|---|---|
| CN | 104278816 A | 1/2015 |
| GN | 207747509 U | 8/2018 |
| KR | 0167719 B1 | 2/1999 |

\* cited by examiner

SOUNDPROOF COMPOSITE FLOORING OF MAGNESIUM SULFATE AND SOLID WOOD

CROSS-REFERENCE TO RELATED APPLICATIONS

This application claims the benefit of priority from Chinese Patent Application No. 201910271984.X, filed on Apr. 4, 2019. The content of the aforementioned application, including any intervening amendments thereto, is incorporated herein by reference in its entirety.

TECHNICAL FIELD

The present application relates to composite floorings, and more particularly to a soundproof composite flooring of magnesium sulfate and solid wood.

BACKGROUND

The typical flooring used in early days is solid wood flooring, which however is easy to suffer deformation, dampness and moth, and is not fireproof, difficult to mount and expensive. Later, the emergence of laminate floorings brings more choices for consumers, but they are also limited in use because these laminate floorings are not fireproof, water-resistant, and formaldehyde-free.

Since the early 1980s, PVC floorings have stepped into the market. As a novel lightweight floor decoration material, also known as "light flooring", currently, the PVC flooring is greatly welcomed around the world, such as Europe, America, and Japan and South Korea in Asia. In China, the PVC flooring has been widely recognized and used in large- and medium-sized cities. For example, it is used in homes and public places such as hospitals, schools, office buildings, factories, supermarkets. However, during use, the edge of the PVC flooring is prone to curling and cracking, which reduces the service life while increasing the noise.

In view of the above problems, based on the rich practical experience and professional knowledge in engineering application of such products in many years, the inventor actively carries out researches in order to provide a soundproof composite flooring of magnesium sulfate and solid wood, aiming to make the flooring more practical.

SUMMARY

The purpose of the present invention is to provide a soundproof composite flooring of magnesium sulfate and solid wood. By improving the structure of the flooring, the service life of the flooring is increased, and the noise is reduced during use.

In order to achieve the above purpose, the present invention adopts the following technical solutions.

Provided is a soundproof composite flooring of magnesium sulfate and solid wood, comprising: a paint layer, a solid wood layer, a magnesium sulfate substrate layer, and a soundproof layer which are sequentially arranged from top to bottom; the solid wood layer and the magnesium sulfate substrate layer are bonded via AB glue by cold pressing or via a hot-melt adhesive; the magnesium sulfate substrate layer and the soundproof layer are bonded via the AB glue by cold pressing or the hot-melt adhesive;

wherein a plurality of cylindrical holes are arranged along edges of an upper surface of the magnesium sulfate substrate layer, and a buffer structure is arranged in each of the cylindrical holes; the buffer structure comprises a rubber base which fits a bottom of each of cylindrical holes, and a support disk which is opposite to the solid wood layer; the rubber base and the support disk are connected by a rubber column;

a top of the support disk is higher than the cylindrical holes and is lower than a top of an AB glue layer; when the solid wood is bonded with the magnesium sulfate substrate layer, the AB glue forms a blind area at each of cylindrical holes.

Further, an outer wall of the rubber base fits an inner wall of each of the cylindrical holes.

Further, an outer diameter of the support disk is smaller than a diameter of the cylindrical holes.

Further, a stepped hole is arranged at the bottom of each of cylindrical holes; a diameter of the stepped hole is larger than a diameter of the rubber column.

Further, a raised structure is arranged on the soundproof layer, and comprises a plurality of raised columns and a raised rod for connecting the raised columns; a lower surface of the magnesium sulfate substrate layer is provided with a concave structure matching with the raised structure.

Further, the raised columns correspond to the cylindrical holes, and the concave structure corresponding to the raised columns on the magnesium sulfate substrate layer has the same outline as the cylindrical holes.

Further, the support disk is a bowl-shaped sucker.

The present invention has the following technical effects.

The support of the buffer structure around the cylindrical hole reduces the occurrence of curling at the edges of the magnesium sulfate substrate layer. When the edges of the magnesium sulfate substrate layer tend to deform, the AB glue itself has a certain deformability, and the following two circumstances may occur. When the connection between the AB glue and the edges of the flooring is valid, outer and inner sides of a circular structure surrounded by a plurality of cylindrical holes are all bonded via the AB glue by cold pressing or the hot-melt adhesive, and the blind coverage area is formed in the cylindrical holes, which can make the gap have a buffer margin due to the buffer structure. When the deformation of the AB glue makes the solid wood layer contact the support disk, the buffer margin allows the edges of the flooring to obtain a flexible space to cope with hard damage caused by external stress, thereby effectively improving the damage resistance at the edge of the flooring and extending the service life.

When the AB glue fails to bond with the edges of the flooring, noise will be generated at the edges of the flooring during use. However, in this invention, the noise is reduced through the buffer structure. Specifically, the vibratory impact between the solid wood layer and the magnesium sulfate substrate layer is alleviated through the buffer structure, so that the soundproof effect is achieved.

BRIEF DESCRIPTION OF THE DRAWINGS

The present invention will be described with reference to the accompanying drawings, from which technical solutions of the present invention will be clear. Obviously, the drawings in the following description are just some embodiments of the present invention. For those of ordinary skill in the art, other drawings can be obtained based on these drawings without creative efforts.

Figure 1:
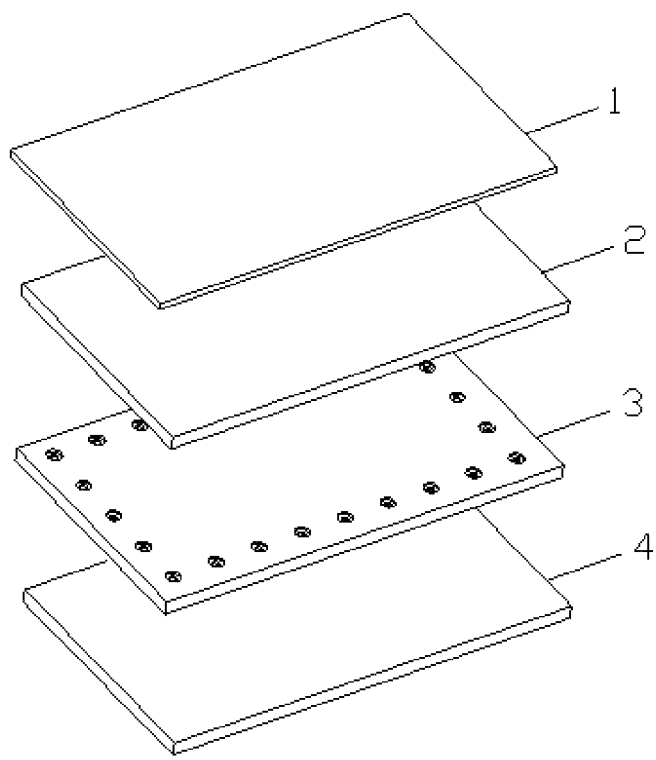
FIG. 1 is a schematic diagram of a soundproof composite flooring of magnesium sulfate and solid wood of the present invention.
Figure 2:
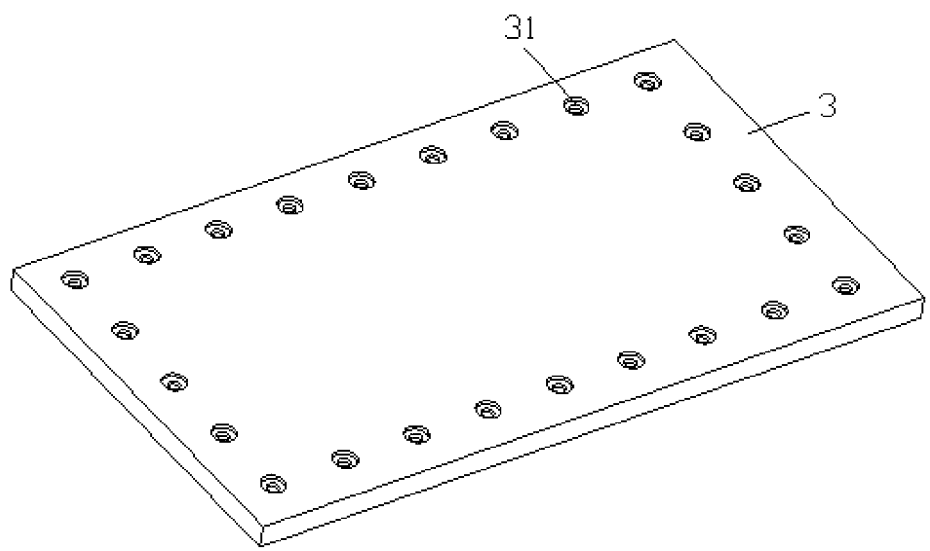
FIG. 2 is a schematic diagram of a magnesium sulfate substrate layer of the soundproof composite flooring of the magnesium sulfate and the solid wood in FIG. 1.
Figure 3:
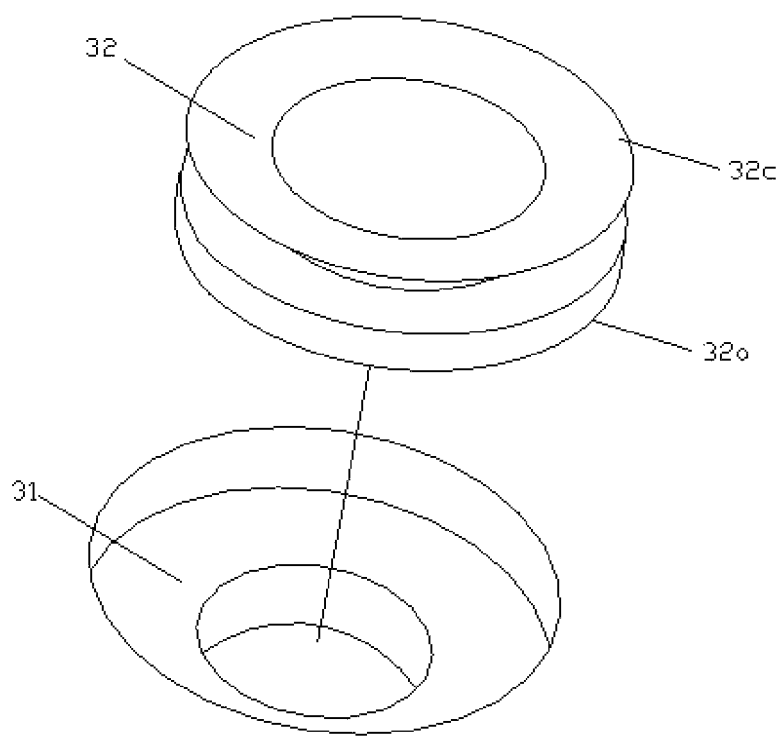
FIG. 3 is a schematic view of a buffer structure and a cylindrical hole, in which the buffer structure and the cylindrical hole are disassembled.
Figure 4:
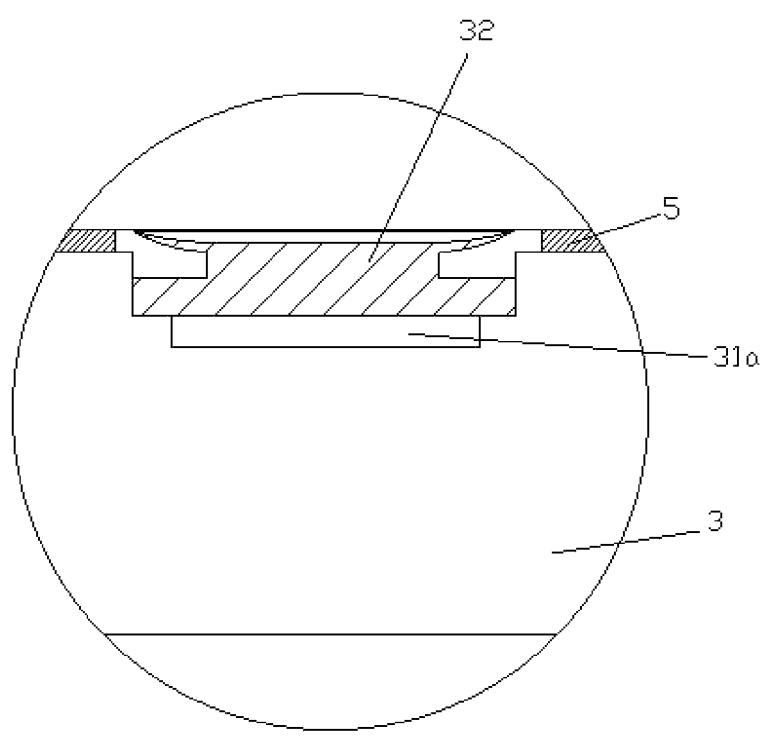
FIG. 4 is a cross-sectional view of the magnesium sulfate substrate layer, in which the buffer structure is mounted.
Figure 5:
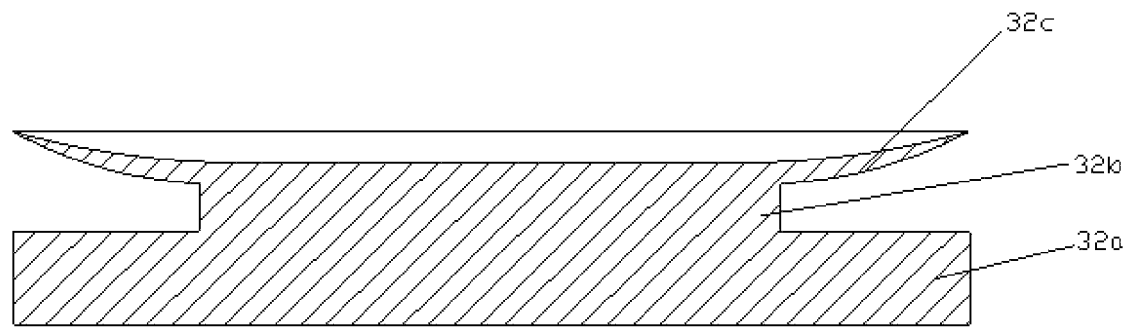
FIG. 5 is a schematic diagram of the buffer structure.

In the drawings: 1, paint layer; 2, solid wood layer; 3, magnesium sulfate substrate layer; 31, cylindrical hole; 31a, stepped hole; 32, buffer structure; 32a, rubber base; 32b, rubber column; 32c, support disk; 4, soundproof layer; 41, raised column; 42, raised rod; 5, AB adhesive layer.

DETAILED DESCRIPTION OF EMBODIMENTS

The present invention will be described with reference to the accompanying drawings, from which the technical solutions of the present invention will be clearer. Obviously, the described embodiments are only a part of the embodiments of the present invention.

As shown in FIGS. 1-5, illustrated is a soundproof composite flooring of magnesium sulfate and solid wood, including a paint layer 1, a solid wood layer 2, a magnesium sulfate substrate layer 3, and a soundproof layer 4 which are sequentially arranged from top to bottom. The solid wood layer 2 and the magnesium sulfate substrate layer 3 are bonded via AB glue by cold pressing or via a hot-melt adhesive. The magnesium sulfate substrate layer 3 and the soundproof layer 4 are bonded via the AB glue by cold pressing or bonded via the hot-melt adhesive.

A plurality of cylindrical holes 31 are arranged along edges of an upper surface of the magnesium sulfate substrate layer 3, and a buffer structure 32 is arranged in each of cylindrical holes 31. The buffer structure 32 includes a rubber base 32a which fits a bottom of the cylindrical hole 31, and a support disk 32c which is opposite to the solid wood layer 2. The rubber base 32a and the support disk 32c are connected by a rubber column 32b. A top of the support disk 32c is higher than the cylindrical hole 31 and is lower than a top of the AB glue layer 5. When the solid wood layer 2 is bonded with the magnesium sulfate substrate layer 3, the AB glue forms a blind area at the cylindrical hole 31.

In this embodiment, the magnesium sulfate substrate layer 3 includes:

30~4 parts by weight of magnesium oxide;
5~15 parts by weight of glass fiber;
20-40 parts by weight of magnesium sulfate;
1-5 parts by weight of modifier;
5-20 parts by weight of filler;
2-5 parts by weight of color paste; and
50-80 parts by weight of water.

Where magnesium sulfate is one or a combination of anhydrous magnesium sulfate and hydrated magnesium sulfate; the filler is one or combinations of sawdust, straw, rice husk, bamboo fibers, perlite and vermiculite; the glass fiber is glass fiber gridding cloth; the modifier is one or combinations of sodium silicate, trisodium phosphate and trisodium citrate. Compared with the traditional SPC flooring, the soundproof composite flooring of magnesium sulfate and solid wood effectively reduces the use of halogen, making the flooring more environment-friendly and safer during use and post-processing. Magnesium chloride is replaced with magnesium sulfate to eliminate chloride ions in the substrate, which improves the moisture absorption, halogen return, and corrosion and other phenomena of the substrate.

In this embodiment, cylindrical holes 31 and the buffer structures 32 provided therein are provided at the edges of the magnesium sulfate substrate layer 3, which can effectively increase the strength at the edges of the floor, thereby extending the service life of the flooring. Specifically, the support of the buffer structure 32 around the cylindrical hole 31 reduces the occurrence of curling at the edges of the magnesium sulfate substrate layer 3. When the edges of the magnesium sulfate substrate layer 3 tend to deform, the AB glue itself has a certain deformability, and the following two circumstances may occur.

When the connection between the AB glue and the edges of the flooring is valid, outer and inner sides of a circular structure surrounded by the cylindrical holes 31 are all bonded via the AB glue by cold pressing or via the hot-melt adhesive, and the blind coverage area is formed in the cylindrical holes 31, which can make the gap have a buffer margin due to the buffer structure 32. When the deformation of the AB glue makes the solid wood layer 2 contact the support disk 32c, the buffer margin allows the edges of the flooring to obtain a flexible space to cope with hard damage caused by external stress, thereby effectively improving the damage resistance at the edge of the flooring and extending the service life.

When the AB glue fails to bond with the edges of the flooring, noise will be generated at the edge of the flooring during use. However, in the present invention, the noise is reduced through the buffer structure 32. Specifically, the vibratory impact between the solid wood layer 2 and the magnesium sulfate substrate layer 3 is alleviated through the buffer structure, so that the soundproof effect is achieved. Therefore, problems caused by post-processing are effectively reduced.

In some embodiments, the outer diameter of the support disk 32c is smaller than a diameter of the cylindrical hole 31, so as to avoid the damage to the support disk 32c during the compression and buffering.

In some embodiments, the outer wall of the rubber base 32a fits the inner wall of the cylindrical hole 31, thus achieving a good support effect and avoiding the movement of the buffer structure 32 during the assembly process.

A stepped hole 31a is arranged at the bottom of the cylindrical hole 31, and a diameter of the stepped hole 31a is larger than that of the rubber column 32b. Thus, a buffer space can be obtained through the setting of the stepped hole 31a when the solid wood layer 2 presses the rubber base 32a through the rubber column 32b, so that the buffer effect is effectively enhanced in the limited space. In some embodiments, the stepped hole 31a is filled with elastic materials.

Figure 6:
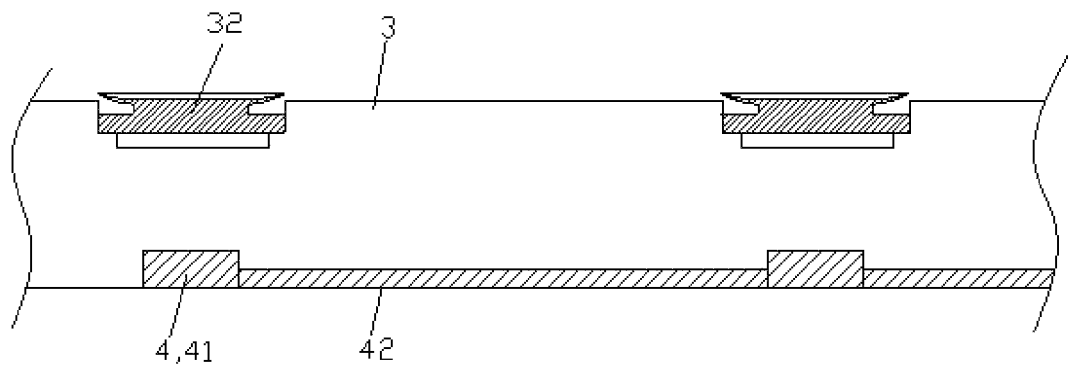
FIG. 6 is a schematic diagram of a raised structure relative to the magnesium sulfate substrate layer.
Figure 7:
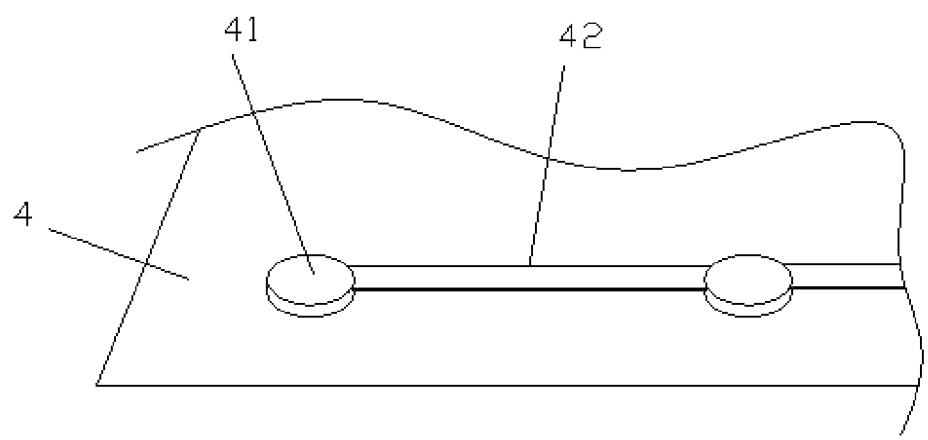
FIG. 7 is a schematic diagram of the raised structure relative to the soundproof layer.

In some embodiments, as shown in FIGS. 6 and 7, a raised structure is arranged on the soundproof layer 4, and includes a plurality of raised columns 41 and a raised rod 42 for connecting the raised columns 41. The lower surface of the magnesium sulfate substrate layer 3 is provided with a concave structure matching with the raised structure. Specifically, the soundproof layer 4 can be made of corks, rubber corks, EVA films or IXPE films, or other foamed films with a soundproof effect, and the thickness of the soundproof layer 4 is 0.5 mm to 3.0 mm.

In some embodiments, the raised structure is an additional plastic structure, and it is first bonded with the soundproof layer 4, and then the soundproof layer 4 is bonded with the magnesium sulfate substrate layer 3. In some embodiments, the raised structure is formed on the upper surface of the soundproof layer 4 in the forming process. The cooperation between the raised structure and the concave structure can further improve the contact between the two adjacent layers and the structural strength, thereby increasing the contact area thereof and reducing the cracking risk of the soundproof layer 4.

In some embodiments, the raised columns 41 correspond to the cylindrical holes 31, and the concave structure corresponding to the raised column 41 on the magnesium sulfate substrate layer 3 has the same outline as the cylindrical holes 31. In this way, the material removal has the same influence on the upper and lower surfaces of the magnesium sulfate substrate layer 3, so that the stability of the entire flooring is ensured, and the flooring has less possibility to deform, thereby extending the service life of the flooring.

In some embodiments, the support disk 32c is a bowl-shaped sucker which has a certain adsorption effect when the solid wood layer 2 has a smooth surface.

The basic principles, main features and advantages of the invention have been described above. However, it should be understood by those skilled in the art that the above embodiment is intended to illustrate the present invention, and not intended to limit the scope of the present invention. Various changes and improvements based on the spirit and principle of the present invention shall fall within the scope of the present invention. The claimed scope of the invention is defined by the appended claims and their equivalents.

What is claimed is:

1. A soundproof composite flooring of magnesium sulfate and solid wood, comprising: a paint layer, a solid wood layer, a magnesium sulfate substrate layer and a soundproof layer, which are sequentially arranged from top to bottom; wherein the solid wood layer and the magnesium sulfate substrate layer are bonded via AB glue by cold pressing or via a hot-melt adhesive; and the magnesium sulfate substrate layer and the soundproof layer are bonded via the AB glue by cold pressing or via the hot-melt adhesive;

wherein a plurality of cylindrical holes are arranged along edges of an upper surface of the magnesium sulfate substrate layer, and a buffer structure is arranged in each of the cylindrical holes; the buffer structure comprises a rubber base which fits a bottom of each of the cylindrical holes, and a support disk which is opposite to the solid wood layer; the rubber base and the support disk are connected by a rubber column;

a top of the support disk is higher than the cylindrical holes and is lower than a top of an AB glue layer; when the solid wood is bonded with the magnesium sulfate substrate layer, the AB glue forms a blind area at each of the cylindrical holes;

an outer wall of the rubber base fits the inner wall of each of the cylindrical holes; and the support disk is a bowl-shaped sucker.

2. The soundproof composite flooring of claim 1, wherein an outer diameter of the support disk is smaller than a diameter of the cylindrical holes.

3. The soundproof composite flooring of claim 1, wherein a stepped hole is arranged at the bottom of each of the cylindrical holes; and a diameter of the stepped hole is larger than a diameter of the rubber column.

4. The soundproof composite flooring of claim 1, wherein a raised structure is arranged on the soundproof layer, and comprises a plurality of a raised columns and a raised rod for connecting the raised columns; and a lower surface of the magnesium sulfate substrate layer is provided with a concave structure matching with the raised structure.

5. The soundproof composite flooring of claim 2, wherein a raised structure is arranged on the soundproof layer, and comprises a plurality of a raised columns and a raised rod for connecting the raised columns; and a lower surface of the magnesium sulfate substrate layer is provided with a concave structure matching with the raised structure.

6. The soundproof composite flooring of claim 3, wherein a raised structure is arranged on the soundproof layer, and comprises a plurality of a raised columns and a raised rod for connecting the raised columns; and a lower surface of the magnesium sulfate substrate layer is provided with a concave structure matching with the raised structure.

7. The soundproof composite flooring of claim 4, wherein the raised columns correspond to the cylindrical holes, and the concave structure corresponding to the raised columns on the magnesium sulfate substrate layer has the same outline as the cylindrical holes.

* * * * *